(12) United States Patent
Fujita

(10) Patent No.: US 11,158,911 B2
(45) Date of Patent: Oct. 26, 2021

(54) TERMINAL CONNECTION STRUCTURE, BATTERY STACK BODY, AND METHOD FOR FORMING TERMINAL CONNECTION STRUCTURE

(71) Applicant: Panasonic Intellectual Property Management Co., Ltd., Osaka (JP)

(72) Inventor: Goro Fujita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 260 days.

(21) Appl. No.: 16/301,656

(22) PCT Filed: May 16, 2017

(86) PCT No.: PCT/JP2017/018312
§ 371 (c)(1),
(2) Date: Nov. 14, 2018

(87) PCT Pub. No.: WO2017/208804
PCT Pub. Date: Dec. 7, 2017

(65) Prior Publication Data
US 2019/0288264 A1    Sep. 19, 2019

(30) Foreign Application Priority Data
May 31, 2016   (JP) .............................. JP2016-109385

(51) Int. Cl.
*H01M 2/20* (2006.01)
*H01M 2/10* (2006.01)
(Continued)

(52) U.S. Cl.
CPC ......... *H01M 50/502* (2021.01); *H01M 50/20* (2021.01); *H01M 50/50* (2021.01);
(Continued)

(58) Field of Classification Search
None
See application file for complete search history.

(56) References Cited

U.S. PATENT DOCUMENTS

2005/0250386 A1   11/2005   Kim
2008/0286636 A1   11/2008   Naito et al.
(Continued)

FOREIGN PATENT DOCUMENTS

CN   101308912 A   11/2008
CN   202142598 U    2/2012
(Continued)

OTHER PUBLICATIONS

International Search Report dated Jul. 4, 2017, issued in counterpart International Application No. PCT/JP2017/018312 (2 pages).

(Continued)

*Primary Examiner* — Christopher P Domone
(74) *Attorney, Agent, or Firm* — Westerman, Hattori, Daniels & Adrian, LLP

(57) ABSTRACT

A terminal connection structure includes: an output terminal protruding from a surface of an exterior can of a battery and having an inclined surface, in a state that battery and a connection object are aligned, the inclined surface being inclined so as to be away from or close to the surface toward the connection object; and a bus bar having connection surface parallel to the inclined surface on one end side, surface contact between the connection surface and the inclined surface causing the one end side to be electrically connected to the output terminal, another end side being electrically connected to the connection object.

10 Claims, 10 Drawing Sheets

(51) Int. Cl.
    *H01M 2/30*     (2006.01)
    *H01M 2/26*     (2006.01)
    *H01R 11/28*     (2006.01)
    *H01M 50/502*     (2021.01)
    *H01M 50/20*     (2021.01)
    *H01M 50/50*     (2021.01)
    *H01M 50/531*     (2021.01)
    *H01M 50/543*     (2021.01)

(52) U.S. Cl.
    CPC ....... *H01M 50/531* (2021.01); *H01M 50/543* (2021.01); *H01R 11/288* (2013.01)

(56) References Cited

U.S. PATENT DOCUMENTS

2014/0308568 A1* 10/2014 Kim .................... H01M 50/543
    429/158
2015/0221924 A1* 8/2015 Lee .................... H01M 50/502
    429/121
2015/0228957 A1* 8/2015 Jeong .................... B23K 26/20
    429/158
2017/0033332 A1 2/2017 Sakai et al.

FOREIGN PATENT DOCUMENTS

| | | |
|---|---|---|
| JP | 2005-322648 A | 11/2005 |
| JP | 2011-233367 A | 11/2011 |
| JP | 2015-15082 A | 1/2015 |
| WO | 2015/045966 A1 | 4/2015 |
| WO | 2015/162996 A1 | 10/2015 |

OTHER PUBLICATIONS

English Translation of Office Action dated Mar. 3, 2021, issued in counterpart CN Application No. 201780030621.6. (4 pages).

* cited by examiner

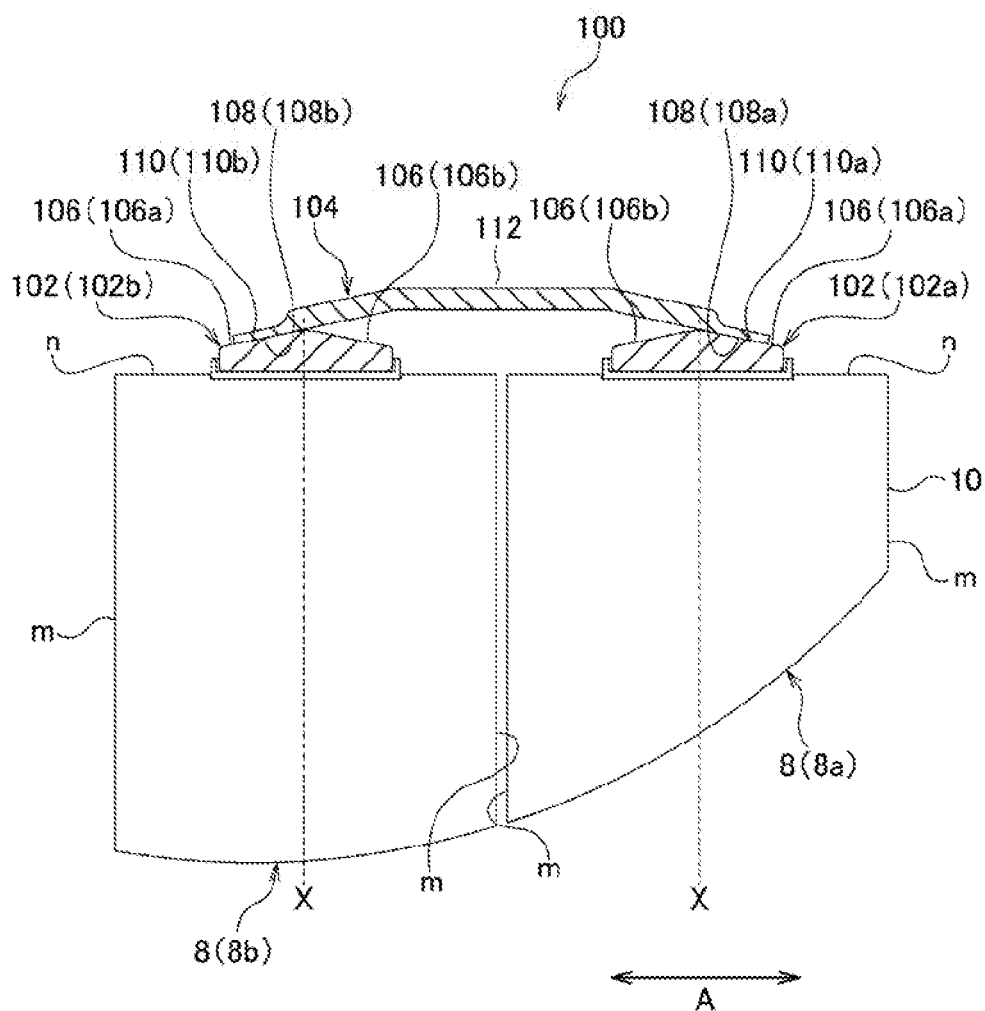

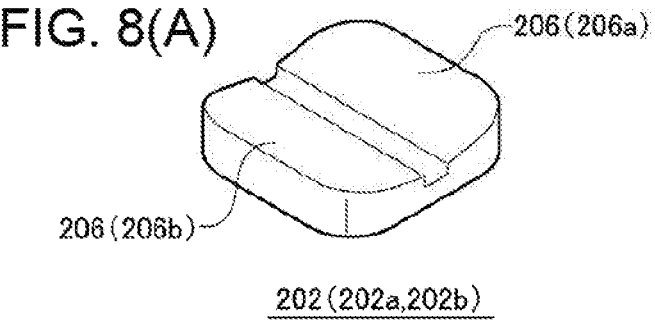
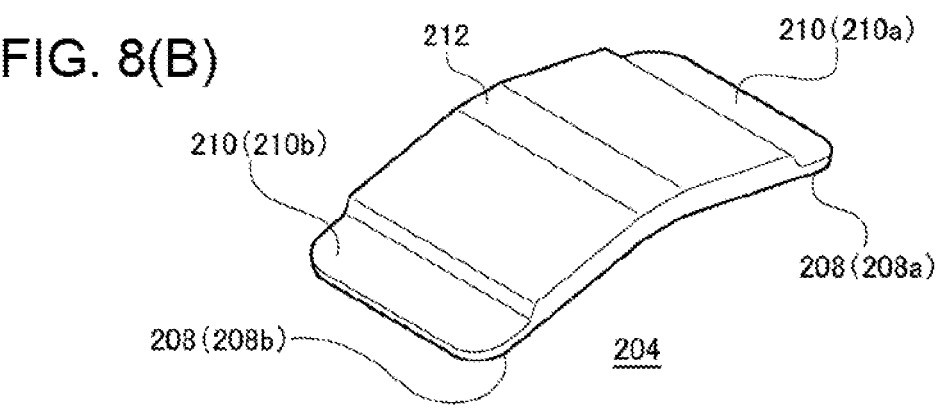
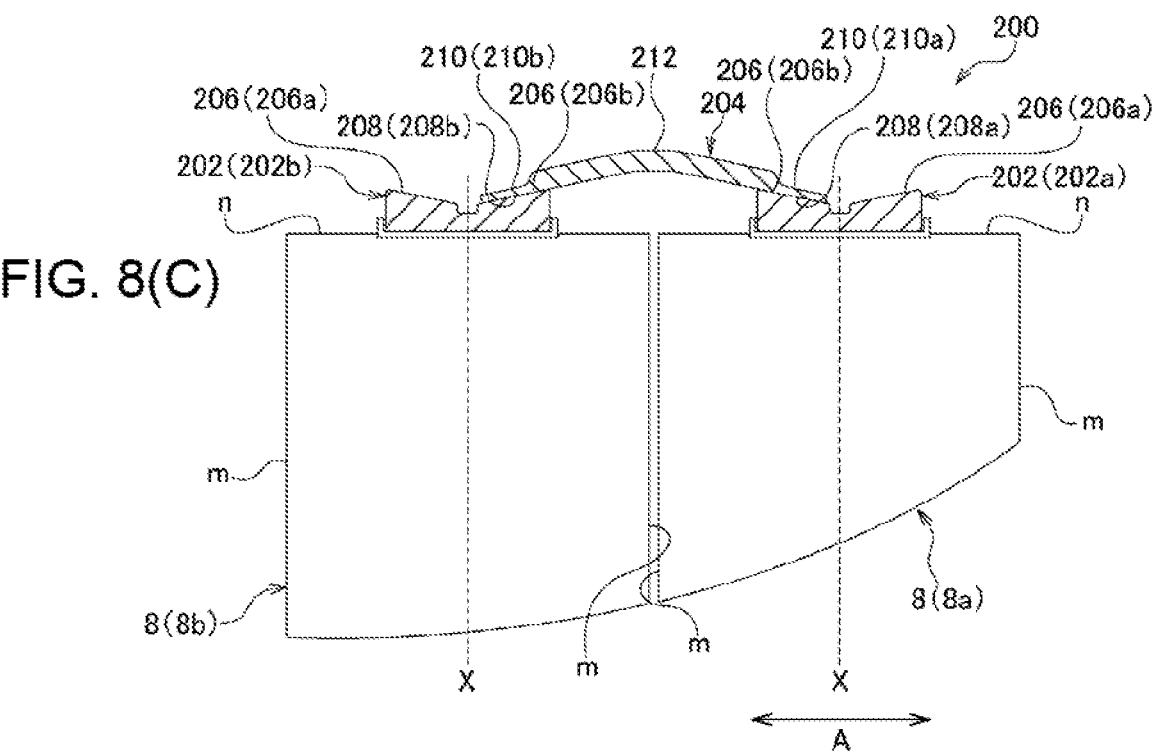

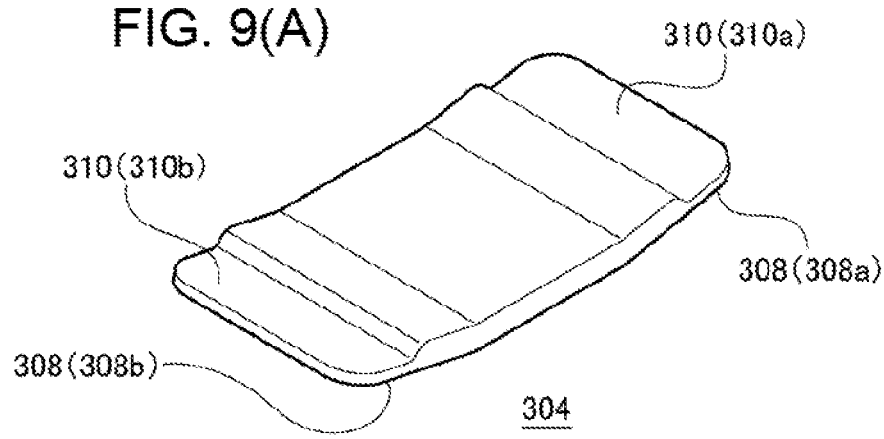
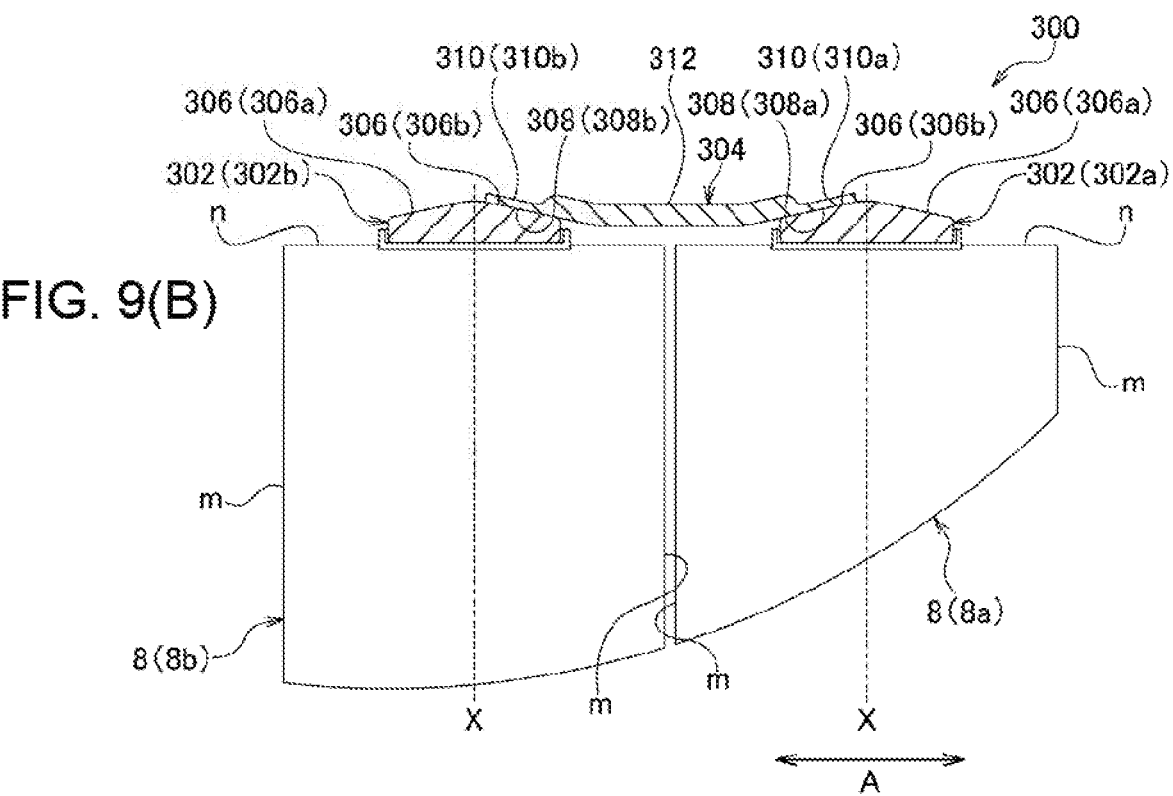

US 11,158,911 B2

TERMINAL CONNECTION STRUCTURE, BATTERY STACK BODY, AND METHOD FOR FORMING TERMINAL CONNECTION STRUCTURE

TECHNICAL FIELD

The present invention relates to a terminal connection structure, a battery stack body, and a method for forming the terminal connection structure.

BACKGROUND ART

For example, as a battery for a vehicle used for a power supply that requires a high output voltage, a battery stack body formed by connecting a plurality of batteries in series is known. Conventionally, this battery stack body has a terminal connection structure in which output terminals of adjacent batteries are electrically connected via a bus bar.

In the above-described terminal connection structure, it can be difficult to connect the output terminal and the bus bar with high connection reliability because of position deviation between the output terminals caused by a dimension error of the battery, or the like. On the other hand, PTL 1 discloses a terminal connection structure in which an abutment surface perpendicular to a surface of a battery lid is provided at an output terminal, a bus bar is pressed against this abutment surface and moved in a direction parallel to the surface of the battery lid to adjust a positional relationship between the abutment surface and the bus bar, thereby absorbing position deviation between the output terminals.

CITATION LIST

Patent Literature

PTL 1: Unexamined Japanese Patent Publication No. 2015-15082

SUMMARY OF THE INVENTION

Technical Problem

As a result of keen examinations on the above-described conventional terminal connection structures, the inventor of the present invention has recognized that there is room to improve connection reliability between the output terminal and the bus bar in the conventional terminal connection structures.

In consideration of this situation, an object of the present invention is to provide a technique for improving connection reliability between an output terminal of a battery and a bus bar.

Solution to Problem

One aspect of the present invention is a terminal connection structure. The terminal connection structure includes: an output terminal protruding from a surface of an exterior can of a battery and having an inclined surface, in a state that the battery and a connection object of the battery are aligned, the inclined surface being inclined so as to be away from or close to the surface toward the connection object; and a bus bar having a connection surface parallel to the inclined surface on one end side, surface contact between the connection surface and the inclined surface causing the one end side to be electrically connected to the output terminal, another end side being electrically connected to the connection object.

Another aspect of the present invention is a battery stack body. The battery stack body includes: the terminal connection structure in the above aspect; and a plurality of batteries electrically connected to each other by the terminal connection structure.

Still another aspect of the present invention is a method for forming a terminal connection structure. The forming method includes: arranging an output terminal that protrudes from a surface of an exterior can of a battery and has an inclined surface and a bus bar that has a connection surface parallel to the inclined surface on one end side such that the inclined surface and the connection surface are brought into surface contact, in a state that the battery and a connection object of the battery are aligned, the inclined surface being inclined so as to be away from or close to the surface toward the connection object; welding the inclined surface and the connection surface by piercing welding performed by irradiating a surface opposite to the connection surface of the bus bar with laser, by fillet welding performed by irradiating a peripheral edge of the connection surface with laser, or by ultrasonic welding, and then electrically connecting the output terminal and one end side of the bus bar; and electrically connecting the connection object and another end side of the bus bar.

Any desired combinations of the above-described components and converted expressions of the present invention in methods, devices, systems, and other similar entities are still effective as aspects of the present invention.

Advantageous Effect of Invention

According to the present invention, connection reliability between an output terminal of a battery and a bus bar can be improved.

BRIEF DESCRIPTION OF DRAWINGS

FIG. 5 is a sectional view illustrating a schematic structure of the terminal connection structure.

FIG. 8(A) is a perspective view illustrating a schematic structure of an output terminal which is a component of a terminal connection structure according to a second exemplary embodiment. FIG. 8(B) is a perspective view illustrating a schematic structure of a bus bar which is a component of the terminal connection structure. FIG. 8(C) is a sectional view illustrating a schematic structure of the terminal connection structure.

FIG. 9(A) is a perspective view illustrating a schematic structure of a bus bar which is a component of a terminal connection structure according to a third exemplary embodiment. FIG. 9(B) is a sectional view illustrating a schematic structure of the terminal connection structure.

DESCRIPTION OF EMBODIMENTS

Figure 1:
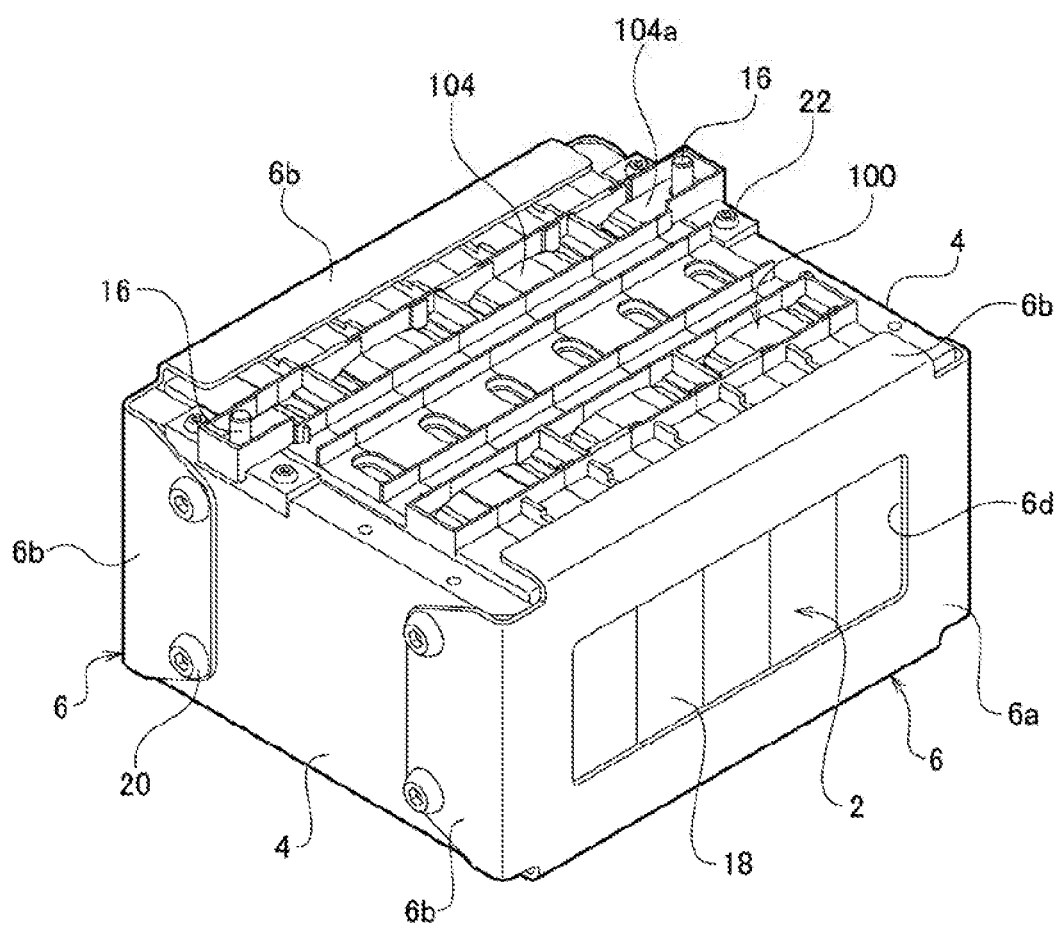
FIG. 1 is a perspective view illustrating a schematic structure of a battery module including a battery stack body according to a first exemplary embodiment.

Hereinafter, the present invention will be described based on preferred exemplary embodiments with reference to the drawings. The exemplary embodiments are exemplifications and should not limit the invention. All the features described in the exemplary embodiments and a combination thereof are not necessarily essential to the invention. Identical reference marks are assigned to identical or equivalent components, members, processes illustrated in the drawings, and the overlap description thereof is omitted as appropriate. Further, scales or shapes of parts illustrated in the drawings are conveniently set to facilitate the description, and should not be interpreted restrictively unless otherwise mentioned. Additionally, the terms "first", "second", and the like used in the present description and claims should not represent any order or importance, but are intended to distinguish between one configuration and another configuration.

First Exemplary Embodiment

Figure 2:
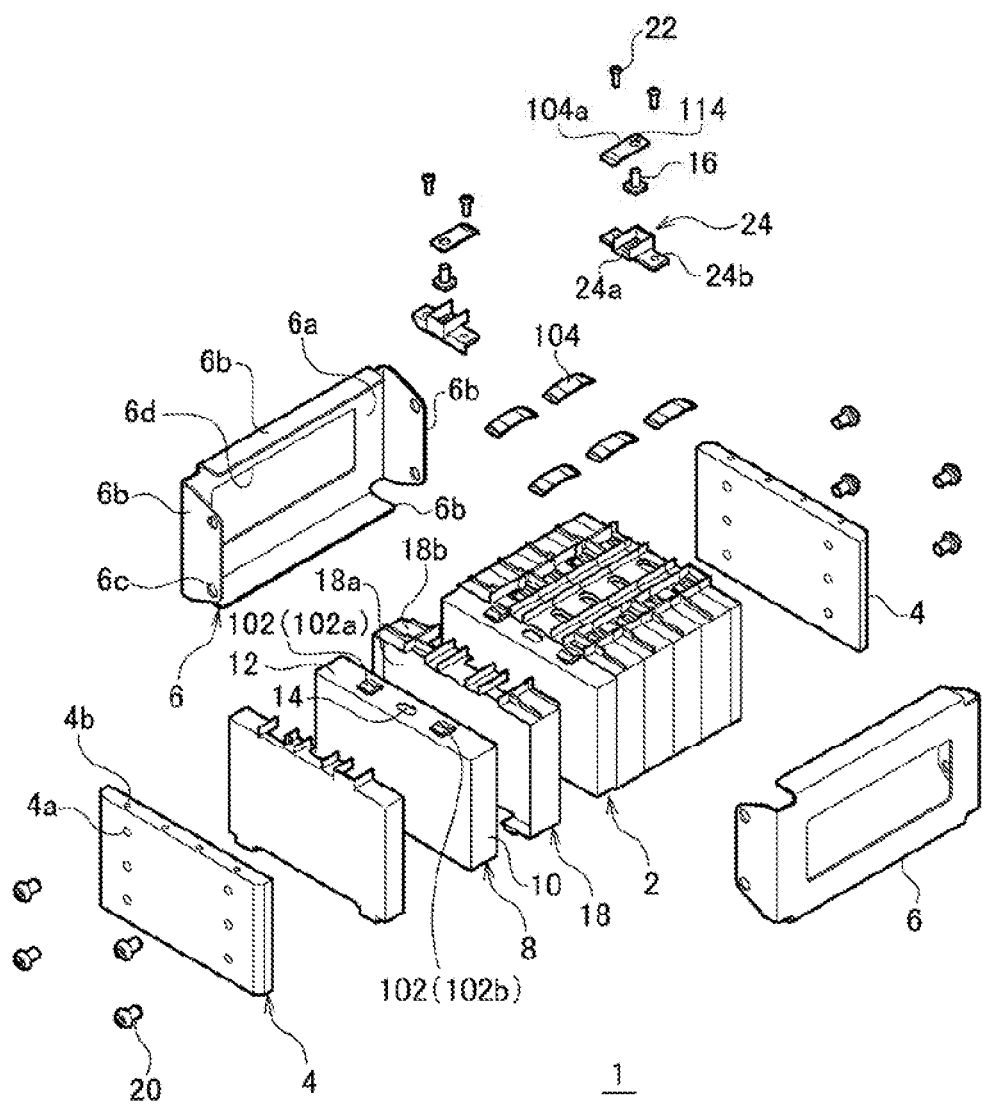
FIG. 2 is an exploded perspective view of the battery module.
Figure 3:
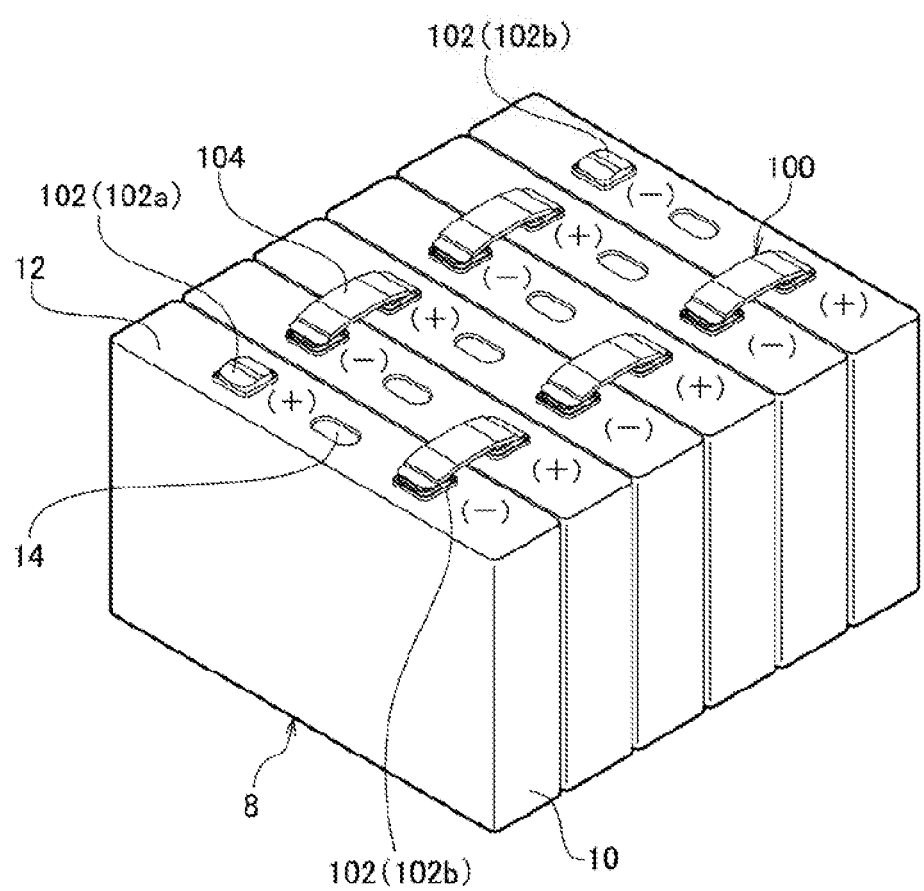
FIG. 3 is a perspective view illustrating a schematic structure of the battery stack body.

FIG. 1 is a perspective view illustrating a schematic structure of a battery module including a battery stack body according to a first exemplary embodiment. FIG. 2 is an exploded perspective view of the battery module. FIG. 3 is a perspective view illustrating a schematic structure of the battery stack body. Note that illustration of a separator is omitted in FIG. 3.

Battery module 1 includes, as a main configuration, battery stack body 2, a pair of end plates 4, and a pair of restraint members 6. Battery stack body 2 includes terminal connection structure 100 according to the present exemplary embodiment and a plurality of batteries 8 electrically connected to each other by terminal connection structure 100. In the present exemplary embodiment, for example, six batteries 8 are connected in series by terminal connection structure 100, whereby battery stack body 2 is formed.

For example, each battery 8 is a rechargeable secondary battery, such as a lithium ion battery, a nickel-hydrogen battery, or a nickel-cadmium battery. Battery 8 is a so-called prismatic battery and has exterior can 10 with a flat rectangular parallelepiped shape. A substantially rectangular opening (not illustrated) is provided on one surface of exterior can 10, and exterior can 10 stores an electrode assembly, an electrolyte, or the like through this opening. Sealing plate 12 for sealing exterior can 10 is provided at the opening of exterior can 10. Sealing plate 12 is provided with output terminal 102 having a positive electrode (positive electrode terminal 102a) near one end in a longitudinal direction, and is provided with output terminal 102 having a negative electrode (negative electrode terminal 102b) near another end in the longitudinal direction. Hereinbelow, when there is no need to distinguish polarities of output terminal 102, positive electrode terminal 102a and negative electrode terminal 102b are collectively referred to as output terminal 102. Sealing plate 12 and output terminal 102 constitute a sealing body. Exterior can 10, sealing plate 12, and output terminal 102 have electrical conductivity and are made of metal, for example.

In the present exemplary embodiment, a side provided with the sealing body serves as a top surface of battery 8, and an opposite side serves as a bottom surface of battery 8. Further, battery 8 has two main surfaces connecting the top surface and the bottom surface. This main surface is a surface having a largest area among six surfaces of battery 8. Remaining two surfaces excluding the top surface, the bottom surface, and the two main surfaces serve as side surfaces of battery 8. A top surface side of battery 8 serves as a top surface of battery stack body 2, and a bottom surface side of battery 8 serves as a bottom surface of battery stack body 2.

In sealing plate 12, safety valve 14 is provided between the pair of output terminals 102. Safety valve 14 can be opened to release internal gas when internal pressure of exterior can 10 rises to a predetermined value or more. Safety valve 14 of each battery 8 is connected to a gas duct (not illustrated), and exhaust gas exhausted from safety valve 14 is discharged to the gas duct.

The plurality of batteries 8 is aligned at predetermined intervals such that the main surfaces of adjacent batteries 8 face each other. Further, each battery 8 is disposed such that output terminal 102 is directed in an identical direction (for convenience herein, upward in a vertical direction). Two adjacent batteries 8 are arrayed such that one positive electrode terminal 102a and other negative electrode 102b are adjacent to each other. Positive electrode terminal 102a and negative electrode terminal 102b are electrically connected via bus bar 104.

Bus bar 104 is a strip-shaped metal plate, for example. A dimension of bus bar 104 is as follows. For example, bus bar 104 has a length of 20 mm to 70 mm, a width of 10 mm to 40 mm, and a thickness of 0.5 mm to 2 mm. One end side of bus bar 104 is electrically connected to positive electrode terminal 102a of one battery 8, and another end side of bus bar 104 is electrically connected to negative electrode terminal 102b of other battery 8 by terminal connection structure 100. In the present exemplary embodiment, six batteries 8 are connected in series.

Further, battery module 1 has a pair of terminal bus bars 104a. Terminal bus bar 104a is a strip-shaped metal plate, for example. One end side of one terminal bus bar 104a is electrically connected to positive electrode terminal 102a that is a terminal of the series connection of batteries 8. Another end side of this terminal bus bar 104a is electrically connected to external connection terminal 16 provided in one end plate 4. Further, one end side of another terminal bus bar 104a is electrically connected to negative electrode terminal 102b that is a terminal of the series connection of batteries 8. Another end side of other terminal bus bar 104a is electrically connected to external connection terminal 16 provided in other end plate 4. External connection terminal 16 is connected to an external load via a wiring line drawn around to the outside of battery stack body 2.

One end side of terminal bus bar 104a is connected to output terminal 102 by terminal connection structure 100. Regarding another end side of terminal bus bar 104a, external connection terminal 16 is inserted into through-hole 114 provided on the other end side of terminal bus bar 104a, whereby terminal bus bar 104a and external connection terminal 16 are electrically connected. Terminal connection structure 100 will be described below in detail.

Further, battery stack body 2 has a plurality of separators 18. Separator 18 is also called an insulating spacer and is formed of resin having an insulation property, for example. Separator 18 is disposed between batteries 8 and between battery 8 and end plate 4. Separator 18 has plane 18a parallel to the main surface of battery 8 and wall 18b extending from a peripheral end of plane 18a in an array direction of batteries 8. Since plane 18a extends between the main surfaces of adjacent batteries 8, exterior cans 10 of adjacent batteries 8 are insulated from each other. Further, since plane 18a extends between battery 8 and end plate 4, exterior can 10 of battery 8 and end plate 4 are insulated from each other.

Further, the top surface, the bottom surface, and the side surfaces of battery 8 are covered with wall 18b. This can suppress a short circuit between adjacent batteries 8 or between battery 8 and end plate 4, which can be caused by, for example, dew condensation on a surface of battery 8 or end plate 4. In other words, a creepage distance between adjacent batteries 8 or between battery 8 and end plate 4 can be secured by wall 18b. Particularly, wall 18b covers the top surface of battery 8, whereby the above-described short circuit can be further suppressed. In the present exemplary embodiment, tips of walls 18b of two adjacent separators 18 abut on each other. Therefore, battery 8 is housed in a space formed by plane 18a and wall 18b.

Note that wall 18b covering the top surface of battery 8 has a cutout at positions corresponding to output terminal 102 and safety valve 14 such that output terminal 102 and end plate 4 are exposed to the outside. Further, a non-forming region of wall 18b is provided at a lower end of plane 18a. As a result, the bottom surface of battery 8 is exposed to the outside. Heat from battery 8 is dissipated via the bottom surface exposed to the outside.

Battery stack body 2 is sandwiched by the pair of end plates 4. Each end plate 4 is disposed so as to be adjacent to outermost battery 8. End plate 4 is made of a metal plate, for example, and is insulated from battery 8 by being adjacent to battery 8 via separator 18. A main surface of separator 18 is provided with screw holes 4a into which fastening screws 20 are screwed. Further, a top surface of separator 18 is provided with screw holes 4b into which fastening screws 22 are screwed. External connection terminal 16 is mounted on end plate 4 via fixing tool 24. Fixing tool 24 has holding part 24a for external connection terminal 16 and through-holes 24b into which fastening screws 22 are inserted. External connection terminal 16 is held by holding part 24a. Through-hole 24b and screw hole 4b are overlapped, and fastening screws 22 are inserted into the overlapped holes, respectively. Accordingly, external connection terminal 16 is mounted on end plate 4.

The pair of restraint members 6 is arrayed in a direction orthogonal to the array direction of the plurality of batteries 8 and the pair of end plates 4. Battery stack body 2 and the pair of end plates 4 are disposed between the pair of restraint members 6. Restraint member 6 has rectangular plane 6a parallel to a side surface of battery stack body 2 and eaves part 6b protruding from an end of each side of plane 6a toward battery stack body 2. Restraint member 6 can be formed by folding each side of a rectangular metal plate, for example. Through-holes 6c into which fastening screws 20 are inserted are provided at each of two eaves parts 6b facing in the array direction of battery stack body 2 and the pair of end plates 4. Plane 6a is provided with opening 6d to expose the side surface of battery stack body 2.

Battery module 1 is assembled as follows, for example. In other words, first, the plurality of batteries 8 and the plurality of separators 18 are alternately arrayed, and are sandwiched by the pair of end plates 4. Accordingly, an assembly is formed. External connection terminal 16 is mounted on end plate 4. Then, the pair of restraint members 6 is mounted on this assembly. A part of the assembly enters a space surrounded by plane 6a and four eaves parts 6b of each restraint member 6. Further, each restraint member 6 is aligned such that through-hole 6c overlaps screw hole 4a of end plate 4. In this state, fastening screws 20 are inserted into through-holes 6c and are screwed into screw holes 4a, respectively. As a result, the plurality of batteries 8 and the plurality of separators 18 are fastened by the pair of end plates 4 and the pair of restraint members 6.

The plurality of batteries 8 is positioned in the array direction by being fastened in the array direction of the batteries 8 by restraint members 6. Further, the plurality of batteries 8 is positioned in a vertical direction by making the bottom surface abut on lower eaves part 6b of restraint member 6 via wall 18b of separator 18 and by making the top surface abut on upper eaves part 6b of restraint member 6 via wall 18b of separator 18. In this state, bus bar 104 or terminal bus bar 104a is electrically connected to output terminal 102 of each battery 8 and external connection terminal 16 of end plate 4, whereby terminal connection structure 100 is formed. Battery module 1 is obtained from the above-described process.

Figure 4A:
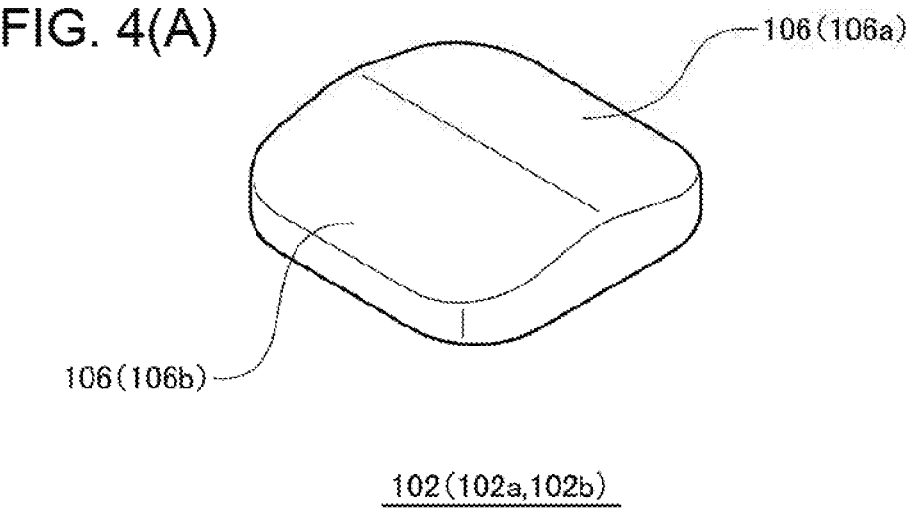
FIG. 4(A) is a perspective view illustrating a schematic structure of an output terminal which is a component of a terminal connection structure.
Figure 4B:
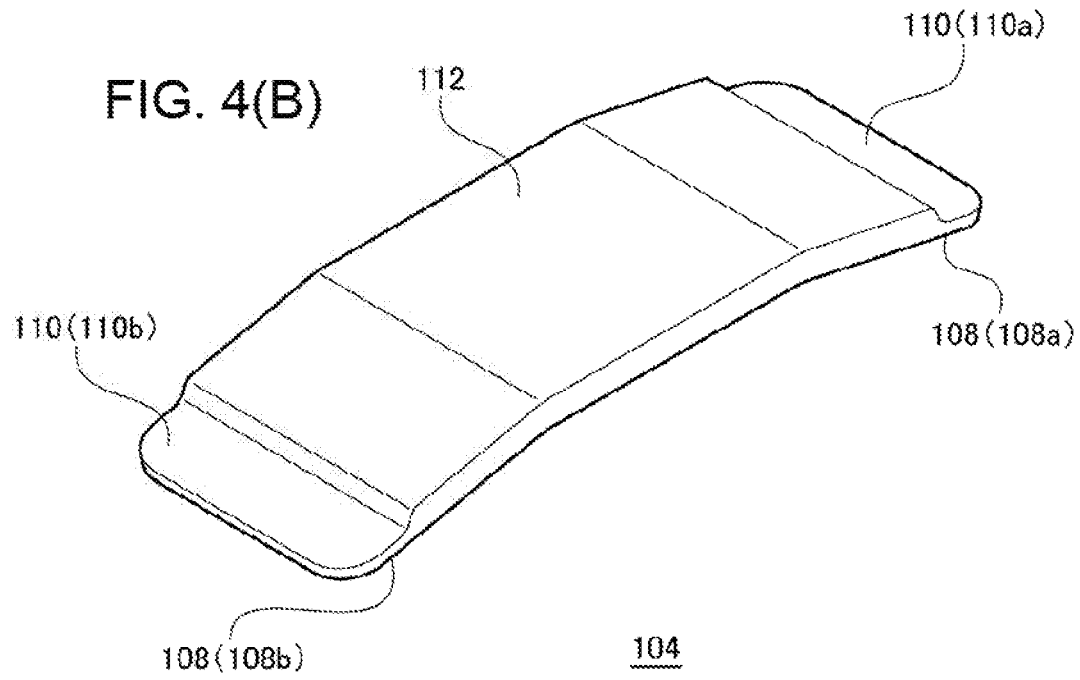
FIG. 4(B) is a perspective view illustrating a schematic structure of a bus bar which is a component of the terminal connection structure.
Figure 6A:
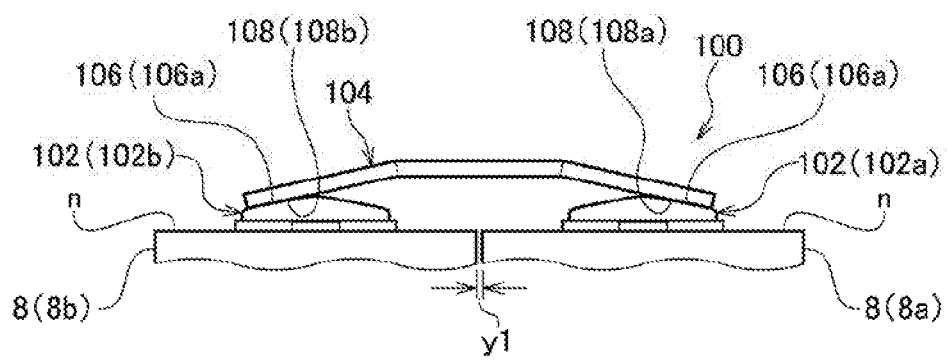
FIGS. 6(A) to 6(C) are schematic views for explaining an action of the terminal connection structure.
Figure 6B:
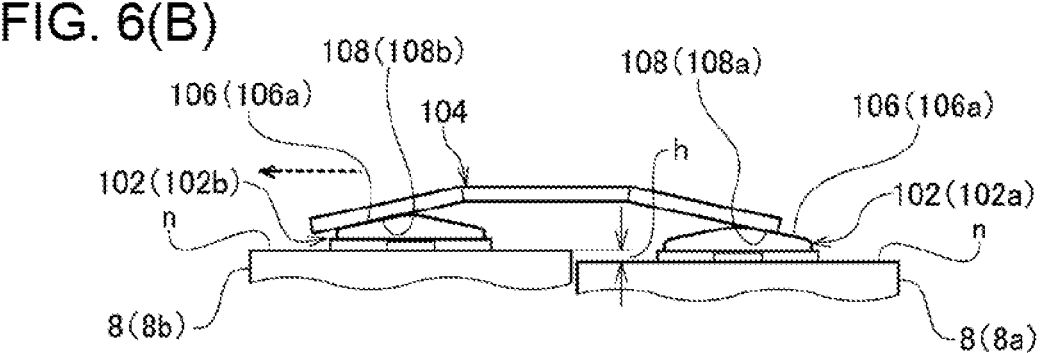
Figure 6C:
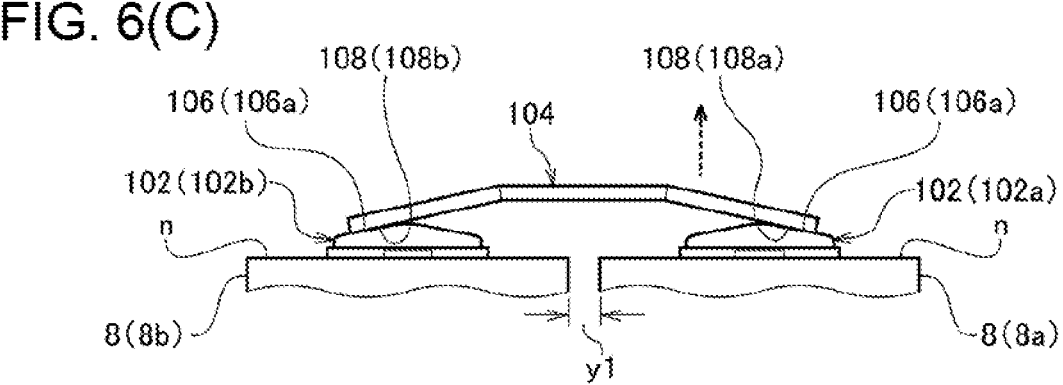

Subsequently, terminal connection structure 100 according to the present exemplary embodiment will be described in detail. FIG. 4(A) is a perspective view illustrating a schematic structure of output terminal 102 which is a component of terminal connection structure 100. FIG. 4(B) is a perspective view illustrating a schematic structure of bus bar 104 which is a component of terminal connection structure 100. FIG. 5 is a sectional view illustrating a schematic structure of terminal connection structure 100. FIGS. 6(A) to 6(C) are schematic views for explaining an action of terminal connection structure 100. Note that illustration of a welded part and an internal structure of battery 8 is omitted in FIG. 5. Further, illustration of separator 18 is omitted in FIGS. 5 and 6(A) to 6(C).

Terminal connection structure 100 includes output terminal 102 protruding from the surface of exterior can 10 of battery 8 and bus bar 104 electrically connected to output terminal 102. Output terminal 102 has inclined surface 106. In a state in which battery 8 and a connection object of battery 8 are aligned, inclined surface 106 is inclined so as to be away from or close to the surface of battery 8 toward the connection object. Bus bar 104 has connection surface 108 parallel to inclined surface 106 on at least one end side. Connection surface 108 and inclined surface 106 are brought into surface contact, whereby the one end side of bus bar 104 is electrically connected to output terminal 102. The other end side of bus bar 104 is electrically connected to the connection object by an arbitrary connection structure.

FIGS. 5 and 6(A) to 6(C) each illustrate a state in which first battery 8a and second battery 8b serving as a connection object of first battery 8a are connected by terminal connection structure 100. Therefore, terminal connection structure 100 includes output terminal 102 (positive electrode terminal 102a) provided on first battery 8a and output terminal 102 (negative electrode terminal 102b) provided on second battery 8b. Further, output terminal 102 of each battery 8 protrudes from top surface n of battery 8. Furthermore, output terminal 102 of each battery has two inclined surfaces 106. Two inclined surfaces 106 are aligned in the array direction of first battery 8*a* and second battery 8*b* and are disposed such that ends which are far from top surface n of battery 8 face each other.

More specifically, two inclined surfaces 106 are inclined so as to be away from top surface n of battery 8 toward center line X of battery 8 in a direction in which two main surfaces m of battery 8 are aligned (a direction indicated by arrow A in FIG. 5). In other words, first inclined surface 106*a* on a side far from the connection object of two inclined surfaces 106 is inclined so as to be away from top surface n toward the connection object. On the other hand, second inclined surface 106*b* on a side close to the connection object is inclined so as to be close to top surface n toward the connection object. Therefore, output terminal 102 has a shape of line symmetry with center line X as a symmetry line, or more specifically a mountain shape.

Bus bar 104 has first connection surface 108*a* parallel to first inclined surface 106*a* of first battery 8*a* on the one end side, and has second connection surface 108*b* parallel to first inclined surface 106*a* of second battery 8*b* on the other end side. Therefore, bus bar 104 has a mountain shape. Further, bus bar 104 has, at a tip on each side, thin-walled part 110 having a thickness thinner than other parts. Illustration of thin-walled part 110 is omitted in FIGS. 6(A) to 6(C). First thin-walled part 110*a* provided at the tip on a side of first connection surface 108*a* includes first connection surface 108*a* on a surface facing output terminal 102. Second thin-walled part 110*b* provided at the tip on a side of second connection surface 108*b* includes second connection surface 108*b* on a surface facing output terminal 102. Further, bus bar 104 has parallel part 112 extending parallel to top surface n of battery 8 in a region between first connection surface 108*a* and second connection surface 108*b*.

The one end side of bus bar 104 is mounted on positive electrode terminal 102*a* of first battery 8*a*, and the other end side of bus bar 104 is mounted on negative electrode terminal 102*b* of second battery 8*b*. In this state, first connection surface 108*a* and first inclined surface 106*a* of first battery 8*a* on a side far from second battery 8*b* are brought into surface contact. Further, second connection surface 108*b* and first inclined surface 106*a* of second battery 8*b* on a side far from first battery 8*a* are brought into surface contact. Therefore, in the present exemplary embodiment, inclined surface 106 included in each of first battery 8*a* and second battery 8*b* and brought into surface contact with bus bar 104 is inclined so as to be away from top surface n toward the other battery.

Thin-walled part 110 and inclined surface 106 are welded by, for example, laser welding, whereby bus bar 104 is fixed to output terminal 102. Thus, output terminals 102 of first battery 8*a* and second battery 8*b* are electrically connected by bus bar 104, and terminal connection structure 100 is formed.

FIG. 6(A) illustrates a connection state between output terminal 102 and bus bar 104 in a case where first battery 8*a*, second battery 8*b*, and separator 18 have designed dimensions. In this case, heights of top surfaces n of first battery 8*a* and second battery 8*b* are identical, and a gap having length y1 is formed between first battery 8*a* and second battery 8*b*. However, battery 8 or separator 18 has dimensional tolerance in general. In other words, the plurality of batteries 8 and separators 18 included in battery stack body 2 have variations in dimensions. As a result, in each battery 8, a height from the bottom surface to top surface n of battery 8 (a height of battery 8) may be different, a position of output terminal 102 on top surface n of each battery 8 may be different, or a thickness of plane 18*a* of each separator 18 may be different.

For example, when a height of first battery 8*a* is lower than a height of second battery 8*b*, as illustrated in FIG. 6(B), deviation of height h can occur between top surface n of first battery 8*a* and top surface n of second battery 8*b*. On the other hand, terminal connection structure 100 in the present exemplary embodiment is a structure in which inclined surface 106 of output terminal 102 and connection surface 108 of bus bar 104 are aligned parallel and brought into surface contact. Therefore, by shifting bus bar 104 from an original position (a position illustrated in FIG. 6(A)) to a position closer to second battery 8*b*, even if there is a level difference between top surface n of first battery 8*a* and top surface n of second battery 8*b*, it is possible to maintain a state in which first inclined surface 106*a* of first battery 8*a* and first connection surface 108*a* are brought into surface contact and a state in which first inclined surface 106*a* of second battery 8*b* and second connection surface 108*b* are brought into surface contact. In other words, dimensional tolerance of battery 8 can be absorbed while maintaining a state in which inclined surface 106 and connection surface 108 are brought into surface contact.

Further, for example, when plane 18*a* of separator 18 is thicker than a reference, as illustrated in FIG. 6(C), a gap having length y2 which is larger than length y1 can be formed between first battery 8*a* and second battery 8*b*. On the other hand, according to terminal connection structure 100 in the present exemplary embodiment, by shifting bus bar 104 upward from the original position (the position illustrated in FIG. 6(A)), even if the gap between first battery 8*a* and second battery 8*b* is larger than the original gap, it is possible to maintain the state in which first inclined surface 106*a* of first battery 8*a* and first connection surface 108*a* are brought into surface contact and the state in which first inclined surface 106*a* of second battery 8*b* and second connection surface 108*b* are brought into surface contact. In other words, dimensional tolerance of battery 8 can be absorbed while maintaining the state in which inclined surface 106 and connection surface 108 are brought into surface contact.

Even if the position of output terminal 102 on top surface n is deviated from an original position and thus a distance between output terminals 102 of adjacent batteries 8 becomes different, it is possible to maintain the state in which inclined surface 106 and connection surface 108 are brought into surface contact by shifting the position of bus bar 104.

Note that the connection object of battery 8 may be, for example, end plate 4 in addition to battery 8. In this case, only the one end side of terminal bus bar 104*a* is connected to output terminal 102 by terminal connection structure 100. In other words, the structure in which inclined surface 106 and connection surface 108 are brought into surface contact is provided only on the one end side of terminal bus bar 104*a*. The other end side of terminal bus bar 104*a* and external connection terminal 16 are electrically connected by inserting external connection terminal 16 into through-hole 114. Even in this case, dimensional tolerance of battery 8 or separator 18 can be absorbed while maintaining a connection state between terminal bus bar 104*a* and external connection terminal 16 and the state in which inclined surface 106 and connection surface 108 are brought into surface contact.

Figure 7A:
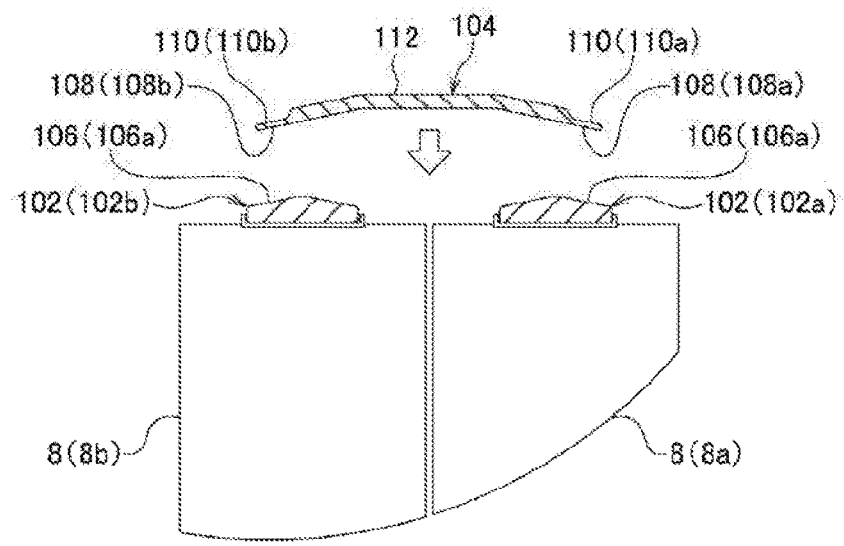
FIGS. 7(A) to 7(C) are process charts for explaining a method for forming the terminal connection structure according to the first exemplary embodiment.
Figure 7B:
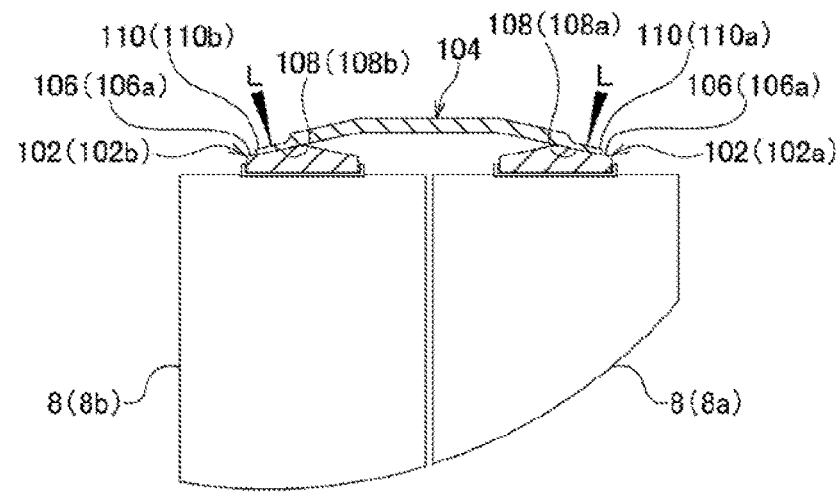
Figure 7C:
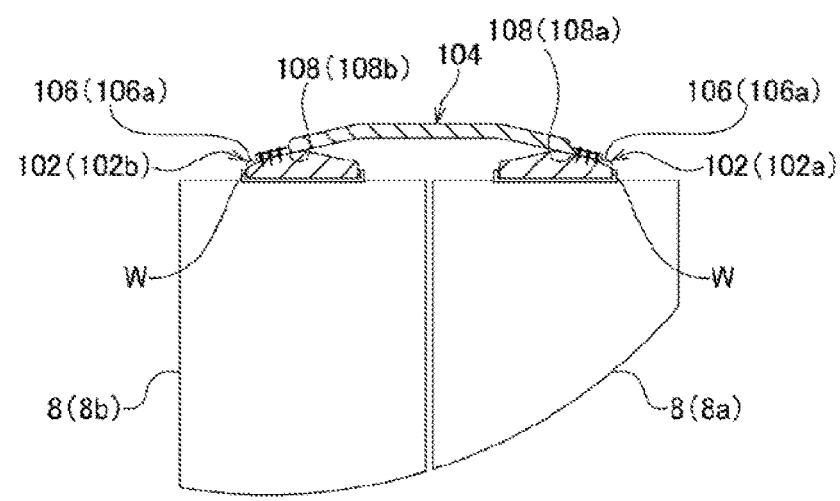

For example, terminal connection structure 100 according to the present exemplary embodiment can be formed as follows. FIGS. 7(A) to 7(C) are process charts for explaining a method for forming terminal connection structure 100 according to the first exemplary embodiment. Note that illustration of the internal structure of battery 8 and separator 18 is omitted in FIGS. 7(A) to 7(C).

First, as illustrated in FIG. 7(A), first battery 8a and second battery 8b each provided with output terminal 102 having inclined surface 106 are prepared. Further, bus bar 104 having first connection surface 108a on the one end side and having second connection surface 108b on the other end side is prepared. Next, first battery 8a and second battery 8b are aligned such that positive electrode terminal 102a of first battery 8a and negative electrode terminal 102b of second battery 8b are adjacent to each other. Then, bus bar 104 is mounted on positive electrode terminal 102a and negative electrode terminal 102b. Bus bar 104 is disposed such that first inclined surface 106a of first battery 8a and first connection surface 108a are brought into surface contact and first inclined surface 106a of second battery 8b and second connection surface 108b are brought into surface contact. When inclined surface 106 and connection surface 108 are brought into surface contact, bus bar 104 is pressed against output terminal 102 by pressing parallel part 112 of bus bar 104. Accordingly, inclined surface 106 and connection surface 108 can be brought into surface contact more easily and stably.

Subsequently, as illustrated in FIG. 7(B), inclined surface 106 and connection surface 108 are welded by piercing welding, for example. Specifically, a surface opposite to first connection surface 108a of bus bar 104 is irradiated with laser L, and laser L is allowed to pass through from the surface toward first connection surface 108a, thereby welding first inclined surface 106a of positive electrode terminal 102a and first connection surface 108a. In the present exemplary embodiment, laser L is irradiated so as to pass through first thin-walled part 110a. As a result, a part of first thin-walled part 110a and a part of positive electrode terminal 102a are melted, and first thin-walled part 110a and positive electrode terminal 102a are welded. Preferably, a plurality of places of first thin-walled part 110a is irradiated with laser L.

Similarly, a surface opposite to second connection surface 108b of bus bar 104 is irradiated with laser L, and laser L is made to pass through from the surface toward second connection surface 108b, thereby welding first inclined surface 106a of negative electrode terminal 102b and second connection surface 108b. In the present exemplary embodiment, laser L is irradiated so as to pass through second thin-walled part 110b. As a result, a part of second thin-walled part 110b and a part of negative electrode terminal 102b are melted, and second thin-walled part 110b and negative electrode terminal 102b are welded. Preferably, a plurality of places of second thin-walled part 110b is irradiated with laser L.

As illustrated in FIG. 7(C), welded part W is formed so as to pierce through an interface between first inclined surface 106a and connection surface 108 by the above-described laser welding, whereby output terminal 102 and bus bar 104 are electrically connected. Terminal connection structure 100 is formed according to the above process.

Note that connection between first battery 8a and bus bar 104 and connection between second battery 8b and bus bar 104 may be executed in any order or may be executed in parallel. Further, in the above-described method for forming terminal connection structure 100, the connection object of first battery 8a is second battery 8b, and second battery 8b is electrically connected to bus bar 104 in a same manner as first battery 8a. However, the connection object of first battery 8a may be end plate 4. In this case, terminal bus bar 104a and end plate 4 are electrically connected by inserting external connection terminal 16 into through-hole 114.

Further, the method for welding output terminal 102 and bus bar 104 is not limited to the piercing welding. For example, inclined surface 106 and connection surface 108 may be welded by fillet welding. Specifically, a boundary portion between a region where inclined surface 106 and connection surface 108 overlap and a region where inclined surface 106 is exposed, that is, a peripheral edge of connection surface 108, is irradiated with laser L, and output terminal 102 and bus bar 104 are connected. Further, inclined surface 106 and connection surface 108 may be welded by ultrasonic welding.

As described above, terminal connection structure 100 according to the present exemplary embodiment includes output terminal 102 having inclined surface 106 inclined so as to be away from the surface of battery 8 toward the connection object and includes bus bar 104 having connection surface 108 parallel to inclined surface 106. Then, connection surface 108 and inclined surface 106 are brought into surface contact, whereby output terminal 102 and bus bar 104 are electrically connected. In other words, in terminal connection structure 100, a contact surface between output terminal 102 and bus bar 104 is inclined so as to be away from the surface of battery 8 in a stacking direction of batteries 8.

As a result, even when a relative positional relationship between two output terminals 102 connected by bus bar 104 or between output terminal 102 and the other connection object is deviated due to, for example, dimensional tolerance of battery 8 or separator 18, occurrence of a gap on the contact surface between output terminal 102 and bus bar 104 can be avoided. As a result, since output terminal 102 and bus bar 104 can be welded easily and with high accuracy, connection reliability between output terminal 102 and bus bar 104 can be improved. Further, improvement of the connection reliability between output terminal 102 and bus bar 104 can cope with an increase in capacity of battery stack body 2.

Further, in the present exemplary embodiment, output terminal 102 has two inclined surfaces 106. Two inclined surfaces 106 are aligned in the array direction of battery 8 and the connection object and are disposed such that the ends which are far from the surface of battery 8 face each other. As a result, output terminal 102 and bus bar 104 can be connected such that bus bar 104 extends toward one main surface m of battery 8 and can be connected such that bus bar 104 extends toward other main surface m of battery 8. In other words, a degree of freedom in a mounting direction of battery 8 to bus bar 104 increases. Hence, an assembling ability of battery stack body 2 can be improved.

Further, in the present exemplary embodiment, both first battery 8a and second battery 8b are connected to bus bar 104 by terminal connection structure 100. As a result, electrical connection between two batteries 8 can be secured. Further, inclined surface 106, of each of first battery 8a and second battery 8b, brought into surface contact with bus bar 104 is inclined so as to be away from the surface toward the other battery. Therefore, bus bar 104 has a mountain shape. As a result, unnecessary contact between bus bar 104 and battery 8 can be reliably avoided.

Further, bus bar 104 has parallel part 112 extending parallel to top surface n or the bottom surface of battery 8 in the region between first connection surface 108a and second connection surface 108b. When bus bar 104 and output terminal 102 are welded, bus bar 104 can abut on output terminal 102 easily and stably by pressing parallel part 112 toward battery 8.

Further, the method for forming terminal connection structure 100 according to the present exemplary embodiment includes a process in which inclined surface 106 and connection surface 108 are brought into surface contact to weld inclined surface 106 and connection surface 108 by piercing welding, fillet welding, or ultrasonic welding. As a result, a welding area between output terminal 102 and bus bar 104 can be increased compared with a case where end surfaces of two welding members are butt-welded. As a result, connection reliability between output terminal 102 and bus bar 104 can be improved.

Second Exemplary Embodiment

A terminal connection structure according to a second exemplary embodiment has a configuration common to the configuration in the first exemplary embodiment except that a shape of an output terminal and a position of an inclined surface on which a connection surface abuts are different. Hereinafter, the configuration of the terminal connection structure according to the present exemplary embodiment that is different from the configuration in the first exemplary embodiment will be mainly described, and description of the common configuration will be made briefly or omitted. FIG. 8(A) is a perspective view illustrating a schematic structure of an output terminal which is a component of the terminal connection structure according to the second exemplary embodiment. FIG. 8(B) is a perspective view illustrating a schematic structure of a bus bar which is a component of the terminal connection structure. FIG. 8(C) is a sectional view illustrating a schematic structure of the terminal connection structure. Note that illustration of a welded part, an internal structure of a battery, and a separator is omitted in FIG. 8(C).

Output terminal 202 provided in terminal connection structure 200 according to the present exemplary embodiment has two inclined surfaces 206. Two inclined surfaces 206 are aligned in an array direction of first battery 8a and second battery 8b and are disposed such that ends which are close to top surface n of battery 8 face each other. More specifically, two inclined surfaces 206 are inclined so as to be close to top surface n of battery 8 toward center line X of battery 8 in a direction in which two main surfaces m of battery 8 are aligned (a direction indicated by arrow A in FIG. 8(C)). In other words, first inclined surface 206a on a side far from a connection object of two inclined surfaces 206 is inclined so as to be close to top surface n toward the connection object. On the other hand, second inclined surface 206b on a side close to the connection object is inclined so as to be away from top surface n toward the connection object. Therefore, output terminal 202 has a valley shape.

Bus bar 204 has connection surface 208 at each end. More specifically bus bar 204 has first connection surface 208a parallel to second inclined surface 206b of first battery 8a on one end side, and has second connection surface 208b parallel to second inclined surface 206b of second battery 8b on another end side. Therefore, bus bar 204 has a mountain shape. Further, bus bar 204 has, at a tip on each side, thin-walled part 210 having a thickness thinner than other portions. First thin-walled part 210a provided at the tip on a side of first connection surface 208a includes first connection surface 208a on a surface facing output terminal 202. Second thin-walled part 210b provided at the tip on a side of second connection surface 208b includes second connection surface 208b on a surface facing output terminal 202. Bus bar 204 has parallel part 212 in a region between first connection surface 208a and second connection surface 208b.

The one end side of bus bar 204 is mounted on positive electrode terminal 202a of first battery 8a, and the other end side of bus bar 204 is mounted on negative electrode terminal 202b of second battery 8b. In this state, first connection surface 208a and second inclined surface 206b of first battery 8a on a side close to second battery 8b are brought into surface contact. Further, second connection surface 208b and second inclined surface 206b of second battery 8b on a side close to first battery 8a are brought into surface contact. Therefore, in the present exemplary embodiment, inclined surface 206 included in each of first battery 8a and second battery 8b and brought into surface contact with bus bar 204 is inclined so as to be away from top surface n toward the other battery.

Connection surface 208 and inclined surface 206 are welded, for example, by laser welding in a same manner as the first exemplary embodiment, whereby bus bar 204 is fixed to output terminal 202. Accordingly, terminal connection structure 200 is formed.

Terminal connection structure 200 according to the present exemplary embodiment can also improve connection reliability between output terminal 202 and bus bar 204, as with the first exemplary embodiment. Further, the other effects can be similarly exhibited.

Further, in the present exemplary embodiment, connection surface 208 of bus bar 204 abuts on second inclined surface 206b on a side close to second battery 8b of two inclined surfaces 206 included in positive electrode terminal 202a of first battery 8a. Therefore, first inclined surface 206a on a side far from second battery 8b is located outside an extension range of bus bar 204. As a result, for example, one end side of different bus bar 204 is connected to first inclined surface 206a, and another end side of this bus bar 204 is connected to positive electrode terminal 202a of third battery 8c (not illustrated) aligned with first battery 8a on a side opposite to second battery 8b, whereby first battery 8a and third battery 8c can be connected in parallel. The same applies to negative electrode terminal 202b of second battery 8b. Hence, a degree of freedom in combination of series connection and parallel connection of batteries 8 in battery stack body 2 can be enhanced.

Third Exemplary Embodiment

A terminal connection structure according to a third exemplary embodiment has a configuration common to the configuration of the first exemplary embodiment except that a shape of a bus bar and a position of an inclined surface on which a connection surface abuts are different. Hereinafter, the configuration of the terminal connection structure according to the present exemplary embodiment that is different from the configuration in the first exemplary embodiment will be mainly described, and description of the common configuration will be made briefly or omitted. FIG. 9(A) is a perspective view illustrating a schematic structure of a bus bar which is a component of the terminal connection structure according to the third exemplary embodiment. FIG. 9(B) is a sectional view illustrating a schematic structure of the terminal connection structure. Note that illustration of a welded part, an internal structure of a battery, and a separator is omitted in FIG. 9(B).

Output terminal 302 provided in terminal connection structure 300 according to the present exemplary embodiment has a same shape as the first exemplary embodiment.

In other words, output terminal 302 has two inclined surfaces 306 aligned in an array direction of first battery 8a and second battery 8b and disposed such that ends which are far from top surface n of battery 8 face each other. Two inclined surfaces 306 are inclined so as to be away from top surface n of battery 8 toward center line X of battery 8 in a direction in which two main surfaces m of battery 8 are aligned (a direction indicated by arrow A in FIG. 9(B)). Therefore, output terminal 302 has a mountain shape.

Bus bar 304 has connection surface 308 at each end. More specifically, bus bar 304 has first connection surface 308a parallel to second inclined surface 306b of first battery 8a on one end side, and has second connection surface 308b parallel to second inclined surface 306b of second battery 8b on another end side. Therefore, bus bar 304 has a valley shape. Further, bus bar 304 has, at a tip on each side, thin-walled part 310 having a thickness thinner than other portions. First thin-walled part 310a provided at the tip on a side of first connection surface 308a includes first connection surface 308a on a surface facing output terminal 302. Second thin-walled part 310b provided at the tip on a side of second connection surface 308b includes second connection surface 308b on a surface facing output terminal 302. Further, bus bar 304 has parallel part 312 in a region between first connection surface 308a and second connection surface 308b.

The one end side of bus bar 304 is mounted on positive electrode terminal 302a of first battery 8a, and the other end side of bus bar 304 is mounted on negative electrode terminal 302b of second battery 8b. In this state, first connection surface 308a and second inclined surface 306b of first battery 8a on a side close to second battery 8b are brought into surface contact. Further, second connection surface 308b and second inclined surface 306b of second battery 8b on a side close to first battery 8a are brought into surface contact. Therefore, in the present exemplary embodiment, inclined surface 306 included in each of first battery 8a and second battery 8b and brought into surface contact with bus bar 304 is inclined so as to be close to top surface n toward the other battery.

Connection surface 308 and inclined surface 306 are welded, for example, by laser welding in a same manner as the first exemplary embodiment, whereby bus bar 304 is fixed to output terminal 302. Thus, terminal connection structure 300 is formed.

Terminal connection structure 300 according to the present exemplary embodiment can also improve connection reliability between output terminal 302 and bus bar 304, as with the first exemplary embodiment. Further, a degree of freedom in combination of series connection and parallel connection of batteries 8 can be enhanced, as with the second exemplary embodiment.

The present invention is not limited to the above-described exemplary embodiments. The exemplary embodiments can be combined, or further modification, such as various design changes, can be added thereto based on knowledge of the person of ordinary skill in the art. The combined or further modified exemplary embodiments are also included in the scope of the present invention. A new exemplary embodiment made by combining the above-described exemplary embodiments or adding modification thereto has effects of both the combined exemplary embodiments and the modifications.

First Modified Example

Figure 10A:
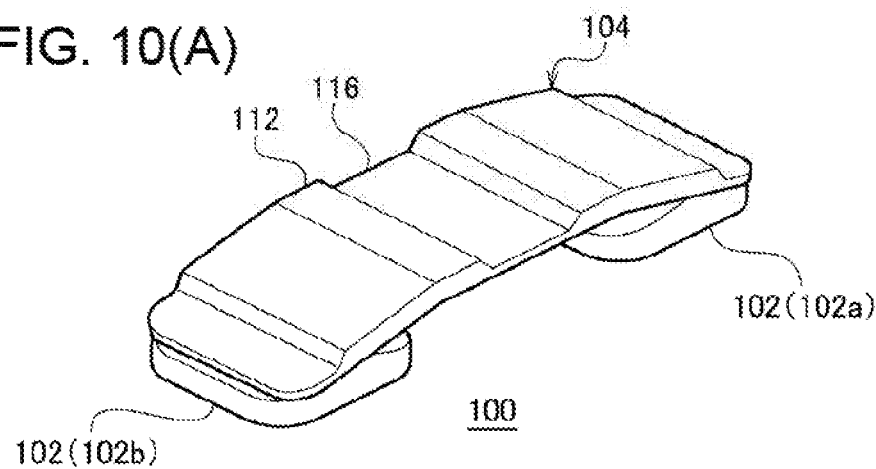
FIG. 10(A) is a perspective view illustrating a schematic structure of a terminal connection structure according to a first modified example.
Figure 10B:
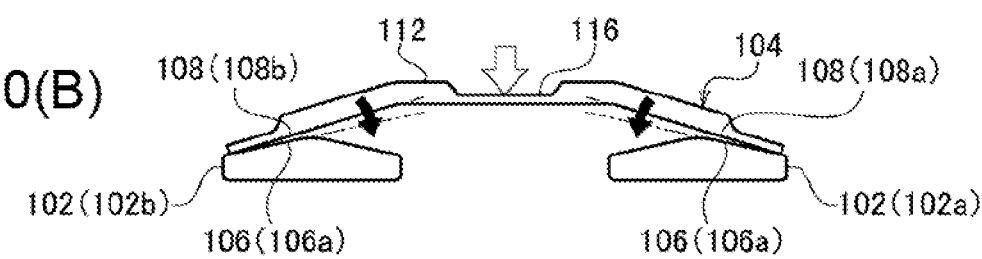
FIGS. 10(B) and 10(C) are schematic views for explaining an action of the terminal connection structure according to the first modified example.
Figure 10C:
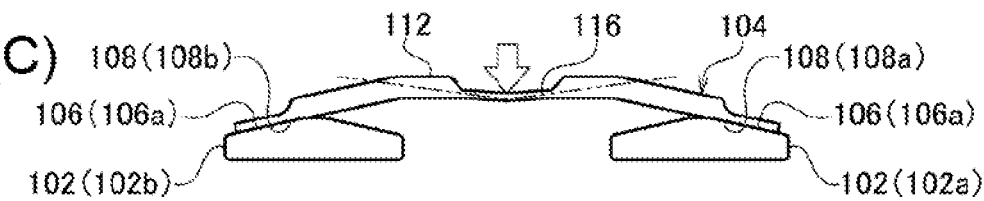

FIG. 10(A) is a perspective view illustrating a schematic structure of a terminal connection structure according to a first modified example. FIGS. 10(B) and 10(C) are schematic views for explaining an action of the terminal connection structure according to the first modified example. Note that illustration of an exterior can of a battery and a separator is omitted in FIGS. 10(A) to 10(C). Further, in the present modified example, a case where modification is added to terminal connection structure 100 according to the first exemplary embodiment will be described by way of an example.

Bus bar 104 included in terminal connection structure 100 according to the present modified example has recess 116 at parallel part 112. Recess 116 is recessed in a stacking direction of bus bar 104 and battery 8. A thickness of parallel part 112 can be thinned by providing recess 116 at parallel part 112. As a result, bus bar 104 can be easily deformed. As illustrated in FIG. 10(B), when bus bar 104 is mounted on positive electrode terminal 102a and negative electrode terminal 102b, before parallel part 112 is pressed, inclined surface 106 and connection surface 108 may not be parallel to cause a gap between inclined surface 106 and connection surface 108.

On the other hand, as illustrated in FIG. 10(C), by pressing parallel part 112 toward battery 8, bus bar 104 can be deformed to bring inclined surface 106 and connection surface 108 into surface contact without a gap. Since bus bar 104 has recess 116 at parallel part 112, bus bar 104 can be deformed more easily. Hence, inclined surface 106 and connection surface 108 can be brought into surface contact more easily. In other words, adhesion between inclined surface 106 and connection surface 108 can be improved.

Further, since parallel part 112 has recess 116, a part of parallel part 112 has a sectional area in a direction orthogonal to an extending direction of bus bar 104 smaller than a sectional area of first connection surface 108a and second connection surface 108b. Bus bar 104 has this small sectional area part, thereby enhancing flexibility of bus bar 104. Further, when a large current of a predetermined value or more flows in bus bar 104, this small sectional area part can be designed to be melted. In other words, a fuse function can be given to bus bar 104.

Second Modified Example

Figure 10D:
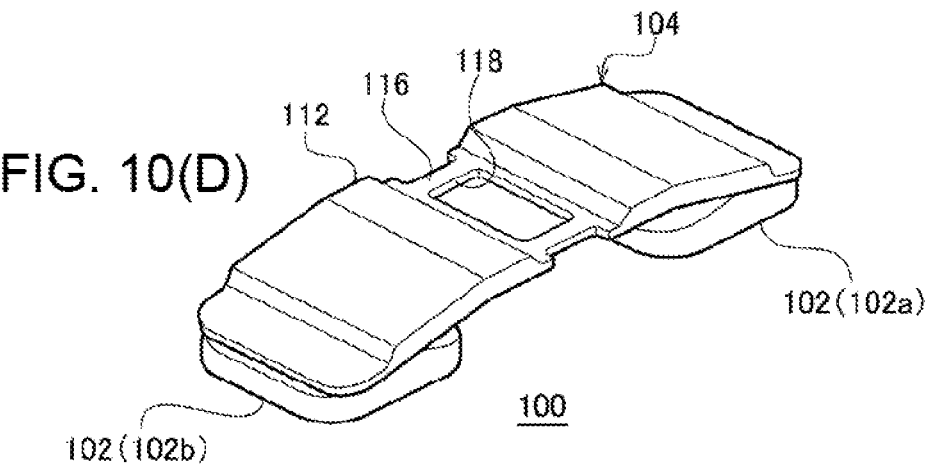
FIG. 10(D) is a perspective view illustrating a schematic structure of a terminal connection structure according to a second modified example.

FIG. 10(D) is a perspective view illustrating a schematic structure of a terminal connection structure according to a second modified example. Note that illustration of an exterior can of a battery and a separator is omitted in FIG. 10(D). Further, in the present modified example, a case where modification is added to terminal connection structure 100 according to the first exemplary embodiment will be described by way of an example.

Bus bar 104 included in terminal connection structure 100 according to the present modified example has recess 116 and opening 118 at parallel part 112. In the present modified example, opening 118 is provided so as to penetrate, in a vertical direction (a thickness direction), a region reduced in thickness by recess 116 in parallel part 112. By providing recess 116 and opening 118 in parallel part 112, flexibility of bus bar 104 can be further increased. Accordingly, adhesion between inclined surface 106 and connection surface 108 can be further improved.

Further, by providing recess 116 and opening 118 in parallel part 112, a sectional area of a small sectional area part can be further reduced. With this configuration, a fuse function can be given to bus bar 104 more reliably. Note that even when parallel part 112 has only opening 118, flexibility can be improved, and the fuse function can be given to bus bar 104.

Note that the above-described first and second modified examples can be applied to the second and third exemplary embodiments.

Other Modified Examples

In the above-described exemplary embodiments, battery 8 is a prismatic battery. However, a shape of battery 8 is not particularly limited and may be cylindrical, for example. Further, a number of batteries 8 included in battery stack body 2 is not particularly limited. Moreover, exterior can 10 may be covered with an insulating sheet, such as a shrink tube.

In the first exemplary embodiment, bus bar 104 may have a crank shape, first connection surface 108a may be brought into surface contact with first inclined surface 106a of first battery 8a, and second connection surface 108b may be brought into surface contact with second inclined surface 106b of second battery 8b. In other words, one end side of the bus bar may have the terminal connection structure of the first exemplary embodiment and another end side of the bus bar may have the terminal connection structure of the third exemplary embodiment.

REFERENCE MARKS IN THE DRAWINGS

2: battery stack body
8: battery
8a: first battery
8b: second battery
10: exterior can
100, 200, 300: terminal connection structure
102, 202, 302: output terminal
104, 204, 304: bus bar
106, 206, 306: inclined surface
108, 208, 308: connection surface
108a, 208a, 308a: first connection surface
108b, 208b, 308b: second connection surface
112, 212, 312: parallel part
116: recess
118: opening

The invention claimed is:

1. A terminal connection structure comprising:
an output terminal protruding from a surface of an exterior can of a battery and having at least two inclined surfaces, wherein in a state that the battery and a connection object of the battery are aligned with each other in an array direction, the at least two inclined surfaces when viewed in a direction parallel to the surface of the exterior can and perpendicular to the array direction is inclined relative to the surface of the exterior can; and
a bus bar having a connection surface parallel to only one of the at least two inclined surfaces on one end side, surface contact between the connection surface and the one of the at least two inclined surfaces causing the one end side to be electrically connected to the output terminal, another end side being electrically connected to the connection object.

2. The terminal connection structure according to claim 1, wherein
the output terminal has two inclined surfaces each being the at least two inclined surfaces, and
the two inclined surfaces are aligned with each other in the array direction of the battery and the connection object and are disposed, such that ends close to the surface or ends far from the surface face each other in the two inclined surfaces.

3. The terminal connection structure according to claim 1, wherein
the terminal connection structure includes the output terminal provided in a first battery and the output terminal provided in a second battery serving as the connection object of the battery, and
the bus bar has a first connection parallel to the one of the at least two inclined surfaces of the first battery on the one end side, the bus bar has a second connection surface parallel to the one of the at least two inclined surfaces of the second battery on the other end side, the first connection surface and the one of the at least two inclined surfaces of the first battery are brought into surface contact, and the second connection surface and the one of the at least two inclined surfaces of the second battery are brought into surface contact.

4. The terminal connection structure according to claim 3, wherein the one of the at least two inclined surfaces included in each of the first battery and the second battery and brought into surface contact with the bus bar is inclined so as to be away from the surface toward the other battery.

5. The terminal connection structure according to claim 3, wherein the one of the at least two inclined surfaces included in each of the first battery and the second battery and brought into surface contact with the bus bar is inclined so as to become closer to the surface toward the other battery.

6. The terminal connection structure according to claim 3, wherein
the first battery and the second battery each have two inclined surfaces each being one of the at least two inclined surfaces,
the two inclined surfaces of each of the batteries are aligned with each other in an array direction of the two batteries and are disposed such that ends that are close to the surface face each other, and
the first connection surface is brought into surface contact with a corresponding one of the two inclined surfaces of the first battery on a side adjacent to the second battery, and the second connection surface is brought into surface contact with a corresponding one of the two inclined surfaces of the second battery on a side adjacent to the first battery.

7. The terminal connection structure according to claim 3, wherein the bus bar has a parallel part extending parallel to the surface in a region between the first connection surface and the second connection surface.

8. The terminal connection structure according to claim 7, wherein the parallel part has at least one of a recess and an opening.

9. The terminal connection structure according to claim 7, wherein, the parallel part has a portion having a sectional area, in a direction orthogonal to an extending direction of the bus bar, that is smaller than a sectional area of the first connection surface and the second connection surface.

10. A battery stack body comprising:
the terminal connection structure according to claim 1; and
a plurality of batteries electrically connected to each other by the terminal connection structure.

* * * * *